(12) United States Patent
Jokschas et al.

(10) Patent No.: US 6,615,990 B1
(45) Date of Patent: Sep. 9, 2003

(54) FILTER CARTRIDGE WITH CENTER TUBE

(75) Inventors: Guenter Jokschas, Murrhardt (DE); Bruno Sommer, Ludwigsburg (DE); Matthaeus Huber, Reisbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/689,622

(22) Filed: Oct. 13, 2000

(30) Foreign Application Priority Data

Oct. 14, 1999 (DE) ..................... 299 18 105 U

(51) Int. Cl.⁷ .......................... B01D 27/06; B01D 27/08
(52) U.S. Cl. ................. 210/457; 210/493.1; 210/493.2; 210/497.01; 210/450
(58) Field of Search ................... 210/493.1–493.2, 210/493.5, 437, 457, 323.2, 232, 497.01, 445, 450, 435

(56) References Cited

U.S. PATENT DOCUMENTS

| | | | | |
|---|---|---|---|---|
| 3,259,248 A | * | 7/1966 | Wiegand | |
| 3,592,766 A | * | 7/1971 | Kudlaty | |
| 4,559,138 A | * | 12/1985 | Harms, II | |
| 5,102,541 A | * | 4/1992 | Breitbach | 210/232 |
| 5,141,637 A | * | 8/1992 | Reed et al. | |
| 5,413,712 A | * | 5/1995 | Gewiss et al. | 210/450 |
| 5,589,060 A | * | 12/1996 | Gerbert et al. | |
| 5,603,829 A | * | 2/1997 | Baumann | 210/275 |
| 5,783,067 A | * | 7/1998 | Belden | |
| 5,814,215 A | * | 9/1998 | Bruss et al. | |
| 5,906,737 A | * | 5/1999 | Hoeppner | |
| 6,016,923 A | * | 1/2000 | Baumann | 210/440 |
| 6,110,365 A | * | 8/2000 | Bartels et al. | 210/232 |

FOREIGN PATENT DOCUMENTS

EP  0 835 158  9/1998

* cited by examiner

Primary Examiner—Matthew O. Savage
Assistant Examiner—Marianne S. Ocampo
(74) Attorney, Agent, or Firm—Crowell & Moring LLP

(57) ABSTRACT

A filter cartridge which has an insertable center tube including an upper part (13) and a lower part (14) which can be coupled together in the cartridge by a snap fastener (21). The snap fastener (21) is configured such that it can be made without undercuts by simple injection molding dies. Therefore the filter cartridge with the center tube according to the invention is very economical.

6 Claims, 1 Drawing Sheet

FILTER CARTRIDGE WITH CENTER TUBE

BACKGROUND OF THE INVENTION

The invention relates to a filter cartridge, especially for filtering fluids, which comprises an annularly closed filter medium having end plates at its end faces, a center tube comprised of upper and lower parts held together by a snap fastener with a seal formed between each of the end plates and the center tube, and a gasket for sealing the filter cartridge in a housing.

A fluid-filtering cartridge of this type with a center tube is disclosed in Bruss et al., U.S. Pat. No. 5,814,215 (=EP 835 158). The center tube is inserted into the pleated filter paper provided with end plates, and a seal is formed between the end plates and the center tube. To facilitate installation of the center tube and avoid damage to the filter paper, the center tube is composed of two parts, so that it can be inserted from both ends into the pleated filter paper. The inwardly extending ends of the center tube parts abut against one another, so that a snap fastener is closed which secures the center tube in the filter paper.

The assembly of the center tube is simplified by the described snap fastener, but due to the configuration of the snap fastener care must be taken during installation to see that the two center tube parts are at the correct angle relative to one another. This is because snap catches on the upper part of the center tube enter into openings in the lower part of the center tube so as to achieve an interlock. There are angular positions between the two center tube parts in which the snap catches come to rest on the bridges between the openings so that a reliable connection between the two parts is not achieved.

SUMMARY OF THE INVENTION

It is therefore an object of the invention to provide a filter cartridge which can be easily assembled, contains few components, and is reliable in both assembly and operation.

These and other objects of the invention are achieved by providing a filter cartridge comprising an annularly closed filter medium having an end plate at each of its axial end faces, a center tube comprised of an upper tube part and a lower tube part held together by a snap fastener whereby a seal is formed between each of the end plates and the center tube, and a gasket for sealing the filter cartridge in a filter housing, wherein the snap fastener is comprised of an annular groove in the outer periphery of the upper tube part and a resilient catch on the bottom tube part, the catch being able to snap into the annular groove regardless of the angular position between upper part and lower part.

The filter cartridge according to the invention has a center tube which is comprised of an upper part and a lower part. These two parts are held together by snap fastener. The center tube is installed in the interior of a filter cartridge, and the end plates belonging to the filter paper achieve a sealing action on the outer circumference of the center tube.

The snap fastener is configured such that, on the upper part of the supporting body or center tube, at the place where it is attached to the bottom part, an annular groove is provided, which is at the outer circumference of the upper part. This means that access to the annular groove from the outside thereof is possible. This has the advantage that it is possible to manufacture of the center tube by injection molding without any difficulty. The mold for such components consists normally of three parts: a core to form the interior and two external shells which can form the openings in the supporting tube as well as the groove without any undercutting.

In contrast to the snap fasteners known in the state of the art, the annular groove has no bridges to which attention must be paid when snapping the parts together. The elastic catches on the bottom part can snap into the annular groove regardless of the angular position of the two center tube parts with respect to one another. To do this the elastic catches yield, so that the upper and lower parts can be fastened together.

The resilience of the catches also simplifies the manufacture of the lower part. It can be made like the upper part in a three-part injection mold. When it is stripped from the mold the resilience of the catches serves to enable the core to be withdrawn from the workpiece in spite of the undercuts formed.

The junction between the center tube and the end plates of the filter paper is sealed. The seal, however, need not be a separate component. The inherent resilience of the end plates can also be used to provide a seal with the center tube. It is preferred to use a radial seal. Especially when the end plates are made of a film this principle can be utilized. The film end plates then are comprised of a nitrile rubber which is bonded by the curing process to the ends of the filter paper, providing a certain residual elasticity to seal against the center tube.

In another embodiment of the invention the resilient catch on the circumference of the lower part can have at least one, but—to be more practical—at least two or more gaps. The result is that the catch is not of an annular configuration but is composed of sectors of a circle. These sectors are substantially more resilient than a continuous ring, so that unrestricted functionality of the snap fastener is assured. Alternatively, the catch could also be made annular, in which case, however, a sufficiently resilient material must be chosen. This can be achieved, for example, by the choice of an elastomer which can be bonded to the bottom part by a multi-component injection molding process.

If the gaps on the circumference are of such dimensions that they occupy a greater angular section than the segments forming the catch, or at least an equal one, the result is an especially advantageous variant of the invention. The core needed for the injection molding can then be stripped out without any elastic deformation of the catch, if the latter is rotated by the angular amount which the sectors occupy. In this manner a greater reliability and speed of the process can be achieved. The parts of the center tube can be stripped even though they have not fully cooled, since partial plasticity of the catch cannot result in any permanent deformation.

Furthermore, in accordance with one specific embodiment of the invention, a recess can be provided on the center tube for a gasket which is necessary for the leak-proof installation of the filter cartridge in the housing. The gasket must assure a reliable separation between the clean side and the raw side of the filter.

The recess can be provided, for example, by an axial groove into which an annular gasket is placed. Another possibility is to provide an annular projection which is suitable for the accommodation of a molded gasket. It is also possible to configure the recess such that both molded gaskets and sealing rings can be installed.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings,in which.

DETAILED DESCRIPTION OF PREFERRED EMBODIMENTS

Figure 1:
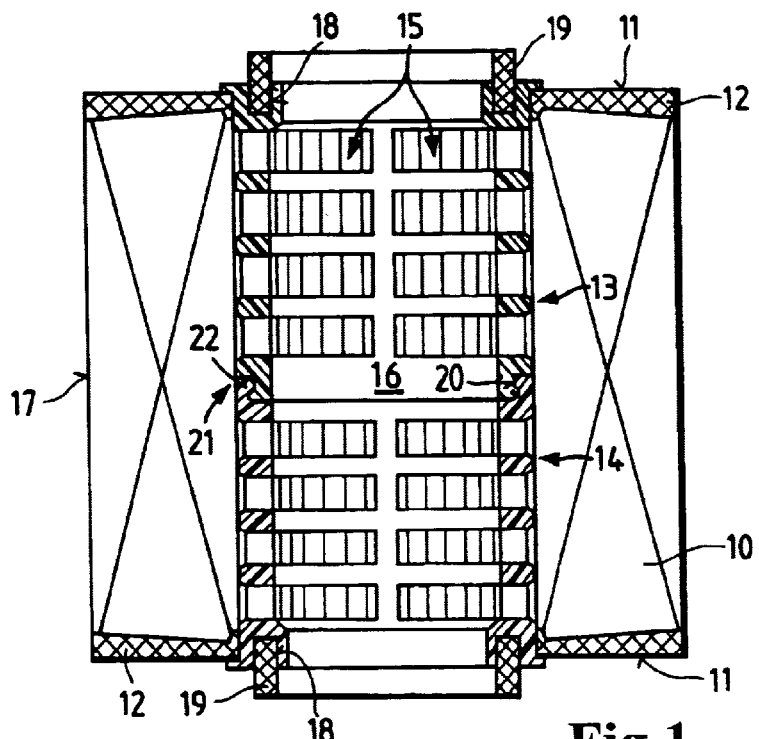
FIG. 1 is a longitudinal section of the filter cartridge of the invention in which a sealing ring is used to seal it in the housing.

The structure of the filter cartridge of the invention can be seen in FIG. 1. It comprises an annularly closed filter medium 10, which advantageously may be a pleated filter paper. At its extremities 11 the filter medium is embedded in end plates 12 of the nitrile rubber. The end plates are in engagement with a center tube which is comprised of an upper part 13 and a lower part 14. Thus a radial seal is formed. The center tube has openings 15 so that its interior can act as the clean side 16 of the filter. The outside of the filter medium thus forms the raw side 17 of the filter. To achieve a seal between the raw side and clean side, an axial groove 18 is provided at each of the ends of the center tube, which is used to accommodate a sealing ring 19.

The upper part 13 and lower part 14 of the center tube are snapped together. For this purpose an annular groove 20 is provided in the upper part, which faces outward, and is in engagement with sectors 21 which for this purpose have a catch 22.

Figure 2:
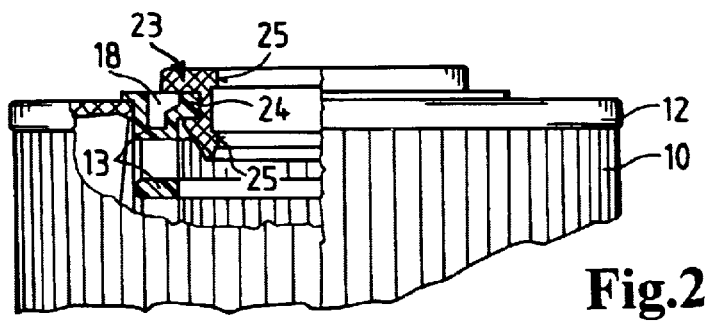
FIG. 2 is a partially cut-away side view of a filter cartridge with a molded seal.

FIG. 2 shows an alternative embodiment of the end of the upper part. To be able to accommodate a molded gasket 23, the upper part has an annular projection 24. The molded gasket can be used, for example, for radial sealing by means of molded lips 25 to an outlet connection (not shown). The top of the upper part 13 is configured such that the axial groove 18 is simultaneously formed. In this manner any accumulation of material in the area of the seal recess on the center tube is avoided. Also, the same upper part can be used to accommodate different gaskets. Thus the tooling costs for variants of the center tube can be avoided, since the same component can be used independently of the gasket.

Figure 3:
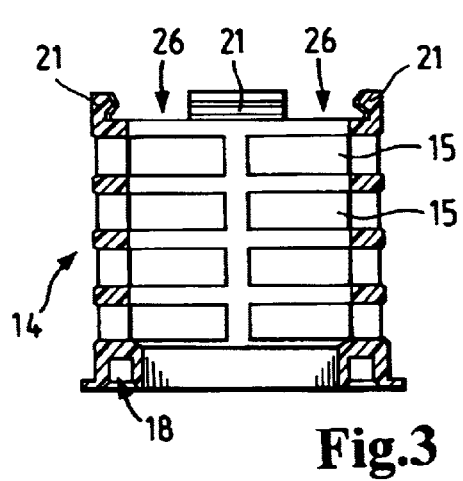
FIG. 3 shows the bottom part of the center tube in central cross section.
Figure 4:
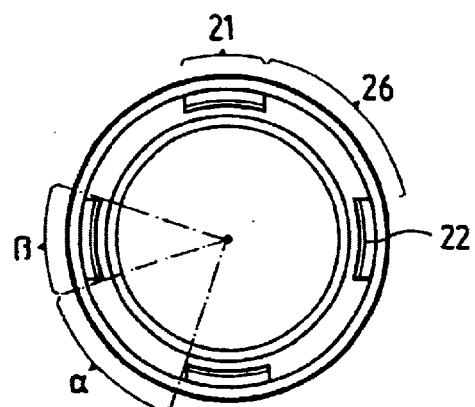
FIG. 4 shows a top view of the bottom part according to FIG. 3.

FIGS. 3 and 4 show the lower part of the center tube as an individual part. Especially to be seen are the sectors 21 which are separated from one another by gaps 26. The gaps occupy an angular section a which is made slightly larger than angular section β which describes the angular extent of the catches 22. A core, not shown, used in producing the lower part can thus be stripped out without engaging undercuts, by rotating it through the angle β.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter cartridge comprising an annularly closed filter medium having an end plate at each of its axial end faces, a center tube comprised of an upper tube part and a lower tube part held together by a snap fastener whereby a seal is formed between each of the end plates and the center tube, and a gasket for sealing the filter cartridge in a filter housing, wherein said snap fastener is comprised of an annular groove in an outer periphery of the upper tube part and a resilient catch on the lower tube part, the resilient catch has at least one gap on a circumference of the lower tube part, said catch being able to snap into the annular groove regardless of the angular position between the upper tube part and the lower tube part, the resilient catch has at least two gaps on the circumference of the lower tube part, and the at least one gap on the circumference of the lower tube part assumes at least a same angular section as sectors separated from one another by a gap and which carry the catch.

2. A filter cartridge according to claim 1, wherein said filter cartridge is a liquid filter.

3. A filter cartridge according to claim 1, wherein the filter medium has film end plates.

4. A filter cartridge comprising an annularly closed filter medium having an end plate at each of its axial end faces, a center tube comprised of an upper tube part and a lower tube part held together by a snap fastener whereby a seal is formed between each of the end plates and the center tube, and a gasket for sealing the filter cartridge in a filter housing, wherein said snap fastener is comprised of an annular groove in an outer periphery of the upper tube part and a resilient catch on the lower tube part, the resilient catch has at least one gap on a circumference of the lower tube part, said catch being able to snap into the annular groove regardless of the angular position between the upper tube part and the lower tube part, and the center tube has an axial recess at each end for receiving the gasket for sealing the filter cartridge in a filter housing.

5. A filter cartridge according to claim 4, wherein said filter cartridge is a liquid filter.

6. A filter cartridge according to claim 4, wherein the filter medium has film end plates.

* * * * *